(12) United States Patent
McCoskey et al.

(10) Patent No.: US 7,445,178 B2
(45) Date of Patent: Nov. 4, 2008

(54) POWERED NOSE AIRCRAFT WHEEL SYSTEM

(75) Inventors: William R. McCoskey, Bothell, WA (US); Richard N. Johnson, Anacortes, WA (US); Matthew J. Berden, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/160,191

(22) Filed: Jun. 13, 2005

(65) Prior Publication Data

US 2006/0065779 A1    Mar. 30, 2006

Related U.S. Application Data

(63) Continuation-in-part of application No. 10/711,610, filed on Sep. 28, 2004, now Pat. No. 7,275,715.

(51) Int. Cl.
*B64C 25/50*    (2006.01)
(52) U.S. Cl. .................... 244/50; 244/100 R; 244/100 S
(58) Field of Classification Search ............. 244/100 R, 244/103, 50, 102 R, 102 A, 103 R, 103 S
See application file for complete search history.

(56) References Cited

U.S. PATENT DOCUMENTS

| | | | |
|---|---|---|---|
| 1,867,602 A | | 7/1932 | Stukenborg |
| 3,059,712 A | | 10/1962 | Hautau |
| 3,211,400 A | * | 10/1965 | Booth ..................... 244/50 |
| 3,419,164 A | | 12/1968 | O'Neill |
| 3,556,441 A | | 1/1971 | Oberlander |
| 3,595,407 A | | 7/1971 | Muller-Kuhn et al. |
| 3,730,359 A | | 5/1973 | Andersson |
| 3,762,670 A | | 10/1973 | Chillson |
| 3,807,664 A | * | 4/1974 | Kelly et al. .................... 244/50 |
| 3,874,619 A | | 4/1975 | Collins et al. |
| 3,977,631 A | | 8/1976 | Jenny |
| 4,312,619 A | | 1/1982 | Anderson et al. |

(Continued)

FOREIGN PATENT DOCUMENTS

DE           3743393           3/1989

(Continued)

*Primary Examiner*—Bret Hayes
*Assistant Examiner*—Benjamin P Lee
(74) *Attorney, Agent, or Firm*—Ostrager Chong Flaherty & Broitman P.C.

(57) ABSTRACT

A powered nose aircraft wheel system (130) for an aircraft (12) includes landing gear (104) that extends from the aircraft (12). A wheel axel (136) is coupled to the landing gear (104). A wheel (134) is coupled to the wheel axel (136). A wheel motor (106) is coupled to the wheel axel (136) and the wheel (134). A controller (120) is coupled to the wheel motor (106) and rotates the wheel (134). A method of taxiing an aircraft (12) includes permitting the wheel (134) of the aircraft (12) to freely spin during the landing of the aircraft (12). Power is transferred from an auxiliary power unit (73) of the aircraft (12) to the wheel motor (106). The wheel (134) is rotated via the wheel motor (106). The aircraft (12) is steered and the speed of the wheel (134) is controlled via one or more controllers selected from an onboard controller (18, 118, 120) and an offboard controller (45, 58, 59).

18 Claims, 12 Drawing Sheets

U.S. PATENT DOCUMENTS

| | | | |
|---|---|---|---|
| 4,416,435 A | 11/1983 | Szendrodi et al. | |
| 4,658,874 A | 4/1987 | von Meyerinck | |
| 4,659,039 A | 4/1987 | Valdes | |
| 4,993,463 A | 2/1991 | von Meyerinck | |
| 5,135,087 A * | 8/1992 | Frost | 192/53.31 |
| 5,600,303 A | 2/1997 | Husseiny et al. | |
| 5,633,544 A * | 5/1997 | Toida et al. | 310/67 R |
| 5,881,973 A | 3/1999 | Agajanian et al. | |
| 6,808,142 B2 | 10/2004 | Oki | |
| 6,863,243 B2 | 3/2005 | Konya et al. | |
| 6,928,363 B2 * | 8/2005 | Sankrithi | 701/120 |
| 2002/0104176 A1 | 8/2002 | Thomas et al. | |
| 2002/0120392 A1 | 8/2002 | Stratton | |
| 2003/0028336 A1 | 2/2003 | Masar et al. | |
| 2003/0105687 A1 | 6/2003 | Koenig et al. | |
| 2004/0186834 A1 | 9/2004 | Lucky et al. | |
| 2005/0224642 A1* | 10/2005 | Sullivan | 244/111 |

FOREIGN PATENT DOCUMENTS

| | | |
|---|---|---|
| DE | 29612083 | 9/1996 |
| DE | 29612083 U | 9/1996 |
| EP | 0150686 | 8/1985 |
| EP | 0756556 B1 | 2/1997 |
| GB | 673998 | 6/1952 |
| GB | 673998 A | 6/1952 |
| GB | 674118 | 6/1952 |
| GB | 674118 A | 6/1952 |
| GB | 2014948 | 9/1979 |
| GB | 2014948 A | 9/1979 |
| GB | 2231073 | 11/1990 |
| JP | 60042108 | 3/1985 |
| WO | 9100214 | 1/1991 |
| WO | WO 91/00214 A | 1/1991 |
| WO | WO9529094 | 11/1996 |
| WO | 0242151 | 5/2002 |
| WO | WO 02/42151 A | 5/2002 |
| WO | WO03072435 | 9/2003 |
| WO | WO 2005/035358 A2 | 4/2005 |
| WO | WO 2006/078322 A2 | 7/2006 |

* cited by examiner

POWERED NOSE AIRCRAFT WHEEL SYSTEM

RELATED APPLICATION

The present application is a continuation-in-part (CIP) of U.S. patent application Ser. No. 10/711,610, filed Sep. 28, 2004, entitled "OPERATIONAL GROUND SUPPORT SYSTEM", which is incorporated by reference herein.

TECHNICAL FIELD

The present invention relates generally to aeronautical vehicle ground support systems and automated controlled ground mobility. More particularly, the present invention relates to integrated systems and methods of providing controlled mobility during ground taxi of an aircraft.

BACKGROUND OF THE INVENTION

It is desirable within the airline industry to provide efficient aircraft servicing and ground mobility. Time involved in taxiing to and from gates and in performing various servicing tasks, is directly related to the amount of time an aircraft is able to spend in flight. The more an aircraft is in flight the higher the potential profits associated with that aircraft.

Aircraft taxing to and from a gate is typically accomplished through the powering one or more of the main aircraft engines and the use of a tow tug or aircraft towing vehicle. The aircraft under the control of the pilot taxis at low speed using power from one or more of the main engines up to and including entry to the gate. Ground personnel help guide the aircraft as the aircraft approaches the gate. When the aircraft is parked prior to entering the gate, due to congestion or other delay, a tow vehicle may be used to bring the aircraft into the gate. When the aircraft leaves the gate a tow vehicle is always used to back the airplane out of the gate. When the aircraft exits the gate one or more of its main engines are operating while the aircraft is pushed back. Once the aircraft is in a position to move forward, the aircraft may do so when the tow vehicle is disconnected from the aircraft and clears the taxiway using thrust from one or more of the main engines.

Aircraft maneuvering during ground operations can pose a significant expense in terms of fuel costs, emission costs, noise reduction costs, repair costs due to damage caused by jet blast, costs due to aircraft colliding with ground equipment, aircraft repair costs associated with damage caused by current taxiing procedures, personnel, and equipment, and labor costs for ground personnel and tug operations.

It is therefore desirable to provide improved aircraft ground operation methods and systems to taxi aircraft into and out of airport terminal gates that overcomes the above-stated and other associated disadvantages.

SUMMARY OF THE INVENTION

One embodiment of the present invention provides a powered nose aircraft wheel system for an aircraft. The system includes landing gear that extends from the aircraft. A wheel and axel are coupled to the landing gear. A wheel may be coupled to a nose landing gear wheel axel. A wheel motor is coupled to the wheel axel and the wheel. A controller is coupled to the wheel motor and responds to pilot demands for aircraft speed by setting the electric current, voltage, and frequency to the wheel motor to meet the demanded speeds.

Another embodiment of the present invention provides a method of taxiing an aircraft, from the terminal gate to a place where the main engines can be powered up for takeoff, or to a place where the main engines can be shutdown after landing. Power is transferred from the auxiliary power unit of the aircraft to the wheel motor via a motor controller. The wheel is rotated via the wheel motor. The aircraft is steered and the speed of the wheel is controlled via one or more controllers. Steering and speed are regulated either by the onboard control of the pilot or by signals transmitted to the motor and steering controller by offboard systems. The method permits each aircraft nose landing gear wheel to freely spin during the landing or takeoff of the aircraft. The basic control function is based on pilot input. However, external commands may be inputted to the controller.

The embodiments of the present invention provide several advantages. One such advantage is the provision of landing gear wheel motors that allow a pilot or a remotely located control system to control the gate and taxiing environment of an aircraft without use of the aircraft main engines. This improves arrival and departure efficiency and productivity of ground operations. This also reduces ground operational fuel costs, noise, air and ground water pollution, labor expenses, aircraft damage from discrete source impacts with other vehicles, gate time, damage due to jet blast, and eliminates the need for tug operations. Elimination of ground support equipment also increases available gate space for more efficient use of airport facilities.

Furthermore, another advantage provided by multiple embodiments of the present invention is the provision of landing gear wheel motors that allow associated wheels to freely spin during high-speed operations and to engage with the motors during low-speed operations. High-speed operations may refer to when the aircrafts speed overdrives the motor speed, which may be realized by virtue of an automatically disengaged cone clutch mechanism. The wheel motors may be used as generators or to some degree as brakes during high-speed operations or when reduced wheel speed is desired to capture and store energy. The stored energy may be utilized during peak demand situations, such as during a breakaway motion or during aircraft acceleration. The wheel motors may be used as a driving source during low-speed operations. The wheel motors may also be operated to pre-spin the tires prior to landing, thereby, reducing wear and high torsional inertia loads on the nose landing gear, tires, and wheel motor assembly.

Yet another advantage provided by an embodiment of the present invention is the provision of an integrated operational ground support system that remotely controls ground maneuvering of multiple aircraft via a single control source. This advantage allows the orchestration of the total mobility of all aircraft in motion at an airport, which facilitates the adoption of closer standards of separation while yet providing a greater margin of safety. This has a beneficial effect upon the overall airport throughput and allows for better operating margins for the user airlines while mitigating the degree of future airport expansion programs.

The present invention itself, together with further objects and attendant advantages, will be best understood by reference to the following detailed description, taken in conjunction with the accompanying drawings.

DETAILED DESCRIPTION

Figure 1:
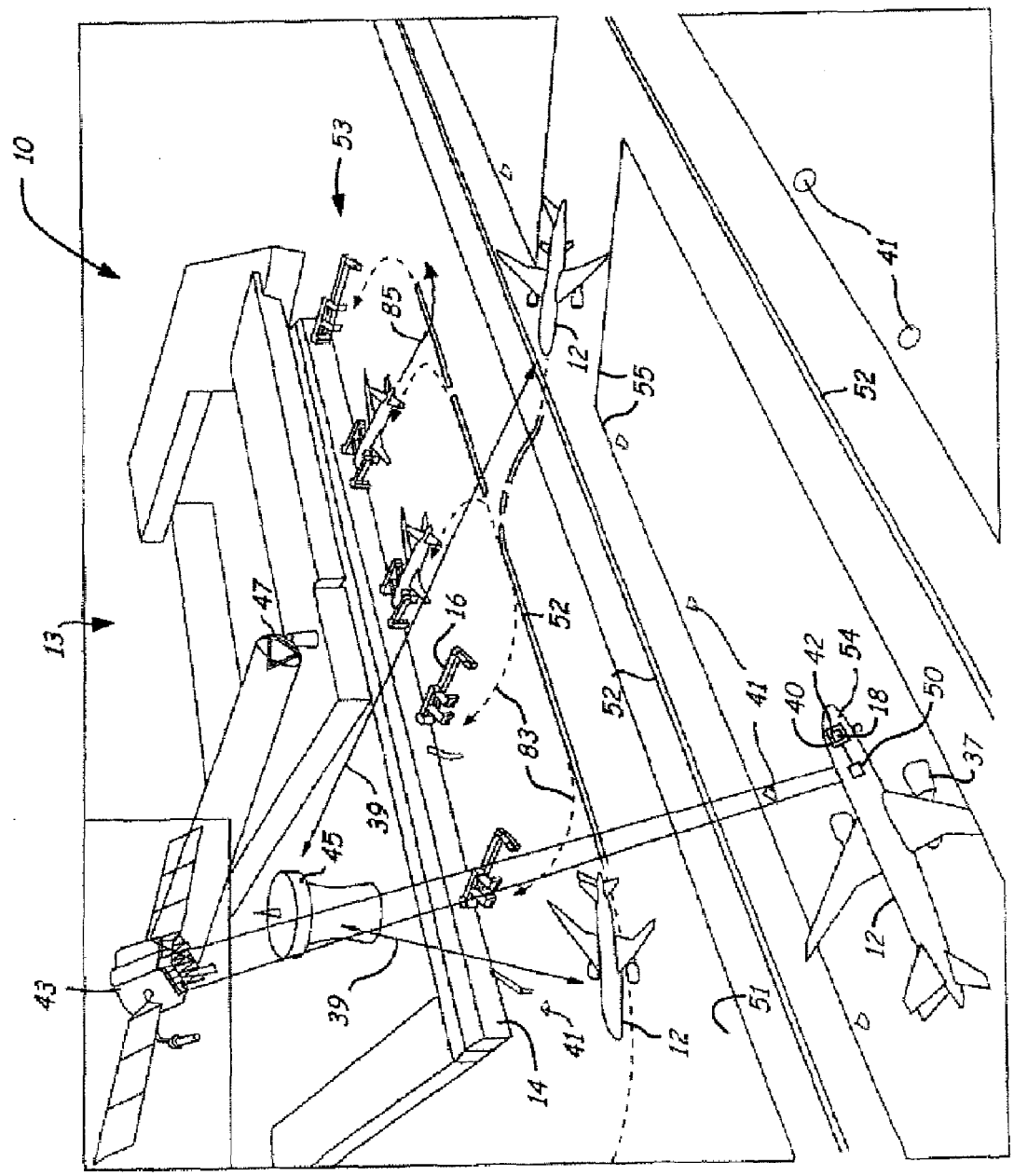
FIG. 1 is a top view of an integrated operational ground support system for aircraft illustrating aircraft guidance and mobility including aircraft arrival in accordance with an embodiment of the present invention.

In each of the following Figures, the same reference numerals are used to refer to the same components. While the present invention is described with respect to systems and methods of controlling ground operation and taxiing of an aircraft, the present invention may be adapted for various applications and systems including: aeronautical systems, land-based vehicle systems, or other applications or systems known in the art that require similar control.

In the following description, various operating parameters and components are described for one constructed embodiment. These specific parameters and components are included as examples and are not meant to be limiting.

Also, in the following description the term "wheel motor" refers to any motor that is directly coupled to and is used to rotate a wheel. A main turbine engine of an aircraft that is separately coupled to the aircraft and is used for in flight operation would not be considered a wheel motor. The reference herein to turbine engines does not reflect a limitation to the technologies and embodiments contained herein to be applied to aircraft with other types of engines such a turbo props and internal combustion reciprocating engines. Example wheel motors are shown with respect to the embodiments of FIGS. 2-6. Although the wheel motors shown are directly coupled and mounted on wheel axles of the associated landing gear, other wheel motors may be envisioned to one skilled in the art.

Additionally, the term "freely spin" refers to the ability of a wheel to spin with minimum drag while decoupled from the drive motor. In this state the wheel can overdrive the motor. The wheel may be automatically decoupled from the motor whenever the wheel is driven back at the motor or, in other words, the wheel is attempting to drive the motor at a speed, which exceeds the speed of the motor. The term freely spin typically implies that an object, such as a wheel, is disengaged and is able to spin on its bearings without resistance from various devices, such as gears, clutches, and motors. However, in this application the term freely spin implies the disengagement from a device preventing its rotation and/or supplying energy for its rotation. During a free spin mode a wheel may be engaged with a wheel motor and the wheel motor may be used as a generator or a brake. This is explained in further detail below.

Referring now to FIG. 1, a top view of an integrated operational ground support system 10 for aircraft 12 illustrating aircraft guidance and mobility including aircraft arrival in accordance with an embodiment of the present invention is shown. The ground support system 10 provides complete autonomous motion of the aircraft 12, free of dependence upon tow tugs. This is accomplished in a manner, which retains full pilot override authority and direct pilot control of all ground movements.

Note that the aircraft 12 shown in FIG. 1 are for example purposes only. The present invention may be applied to various other aircraft known in the art. The ground support system 10 includes the aircraft 12. The aircraft 12 may include an onboard aircraft terminal mating control system 40 for guidance of the aircraft 12 to and from the terminal 14.

The onboard system 40 includes a main controller 18, a global positioning system (GPS) or navigation system 42, which is in communication with GPS satellites 43 (only one is shown) and central tower 45 and is used by the controller 44 to guide the aircraft 12 upon landing on the ground to the terminal 14. This guidance may be referred to as vehicle free ramp operations.

The main controller 18 permits normal ground taxi and gate operations with the main engines 37 of the aircraft 12 in a depowered or OFF state and relies on power from aircraft auxiliary power units to operate electric wheel motors integrated into the nose wheel hubs. Of course, although not shown, wheel motors may be incorporated in landing gear other than in the nose landing gear. Examples of an auxiliary power unit, electric wheel motors, and nose wheel hubs are shown in FIGS. 2-6. Incorporating means to maneuver the aircraft 12 on the ground with only auxiliary power enables the main engines 37 to be OFF. This enables a fully automated gate. This also enables all aircraft ground movements to be under a single remote source control, such as the tower 45.

In another embodiment, the power for the motor wheel may be supplied by any one or several means of ground power supply known within the industry. The ground power distribution and pick up further reduces the noise, air, and water pollution produced at the airports.

The airport infrastructure includes maintenance operations scheduling and support 46 and may be in communication with the aircraft 54 via the tower 45 or the ground antenna 47. Systems, equipment, and personal needed to perform unscheduled service requirements discovered in flight may be ready upon arrival of the aircraft 12 and 54 for such performance.

Guidance/control signals 39 are transmitted and received between the tower 45 and the aircraft 54 when on the tarmac 51. This assures that adequate ground separation is maintained and discreet source ground movement damage is minimized. The guidance signals are utilized for both arrival and departure as indicated by arrival arrows 83 and backup arrow 85.

The largest percentage of damage to an aircraft occurs while an aircraft is on the ground. The damage may occur when taxiing and colliding with other aircraft or ground equipment, or while parked at a terminal gate by support operations vehicles. Another source of damage is the ingestion of tarmac debris by the main engines while taxiing. By running the APU for the taxi operation, the engine damage caused by the ingestion of tarmac debris is significantly reduced. The onboard system 40 guides the aircraft 12 by automated means and controls the speed and position of each individual aircraft while in motion. The onboard system 40 is tower controlled via automatic pilot and is employed for ground movement. By having aircraft at a particular airport under controlled motion, ground separation requirements can be reduced. A reduction in ground separation requirements increases airport capacity while reducing the risk of collision with other aircraft and objects.

Once the aircraft 12 is in close proximity with the terminal 14, a precision guidance system 50 is used in replacement of the navigation system 42. The precision guidance system 50 precisely guides the aircraft 12 to the appropriate docking ports or gates using machine vision controlled robotics techniques known in the art. There is also employed a near gate proximity guide-strip or guideline 52 on the tarmac 51, which is used for rapid and precise guidance of the aircraft 12 to the appropriate docking ports or gates.

The ground support system 10 utilizes GPS cross runaway and tarmac route control. GPS cross runaway refers to the pavement connection between runways that the aircraft 12 crosses when taxiing to and from a terminal tarmac area 53. Tarmac route control refers to the position control of the aircraft 54 on the tarmac 51, which may include control of the aircraft 12, as well as other aircraft known in the art. Aircraft positions are monitored by the guidance system 50 inclusive of GPS via ground based antenna arrays 41 that may be in or on tarmac guide strips 55. Final precision guidance is performed via machine vision. The ground based antenna arrays 41 may be used to perform triangulation in determining aircraft position. Control of the aircraft 54 may be software customized to individualize airport requirements and configurations. The aircraft 54 navigation capability is also used by the control system to ensure accurate positioning and ability to tolerate failures during emergency conditions. The use of GPS cross runaway and tarmac route control in coordination with the guideline 52 enables rapid ground movement and control and precision gate alignment with minimal system implementation cost. In one embodiment of the present invention the guideline 52 is continuous to maintain control of the aircraft 12.

Once the aircraft 12 is staged to the terminal 14, a system based on machine vision technology orients the docking ports in vertical and horizontal directions. After alignment, a bridge, such as bridge 16, is extended and mated with the aircraft 54. Once the aircraft 54 is mated to the bridge 16 one or more aircraft doors are opened and the aircraft 54 is serviced.

Figure 2:
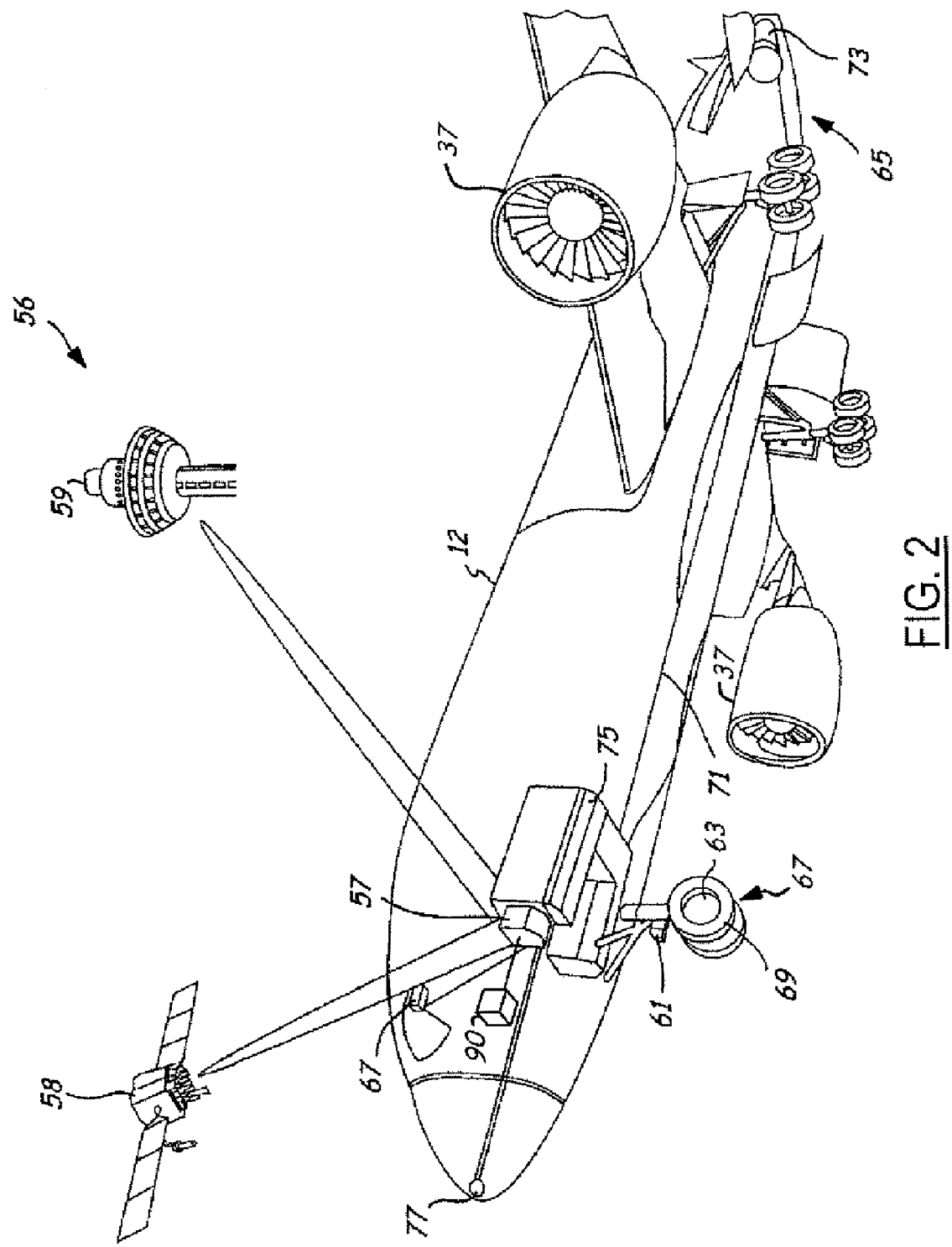
FIG. 2 is a perspective view of an aircraft guidance and mobility system in accordance with an embodiment of the present invention.
Figure 4:
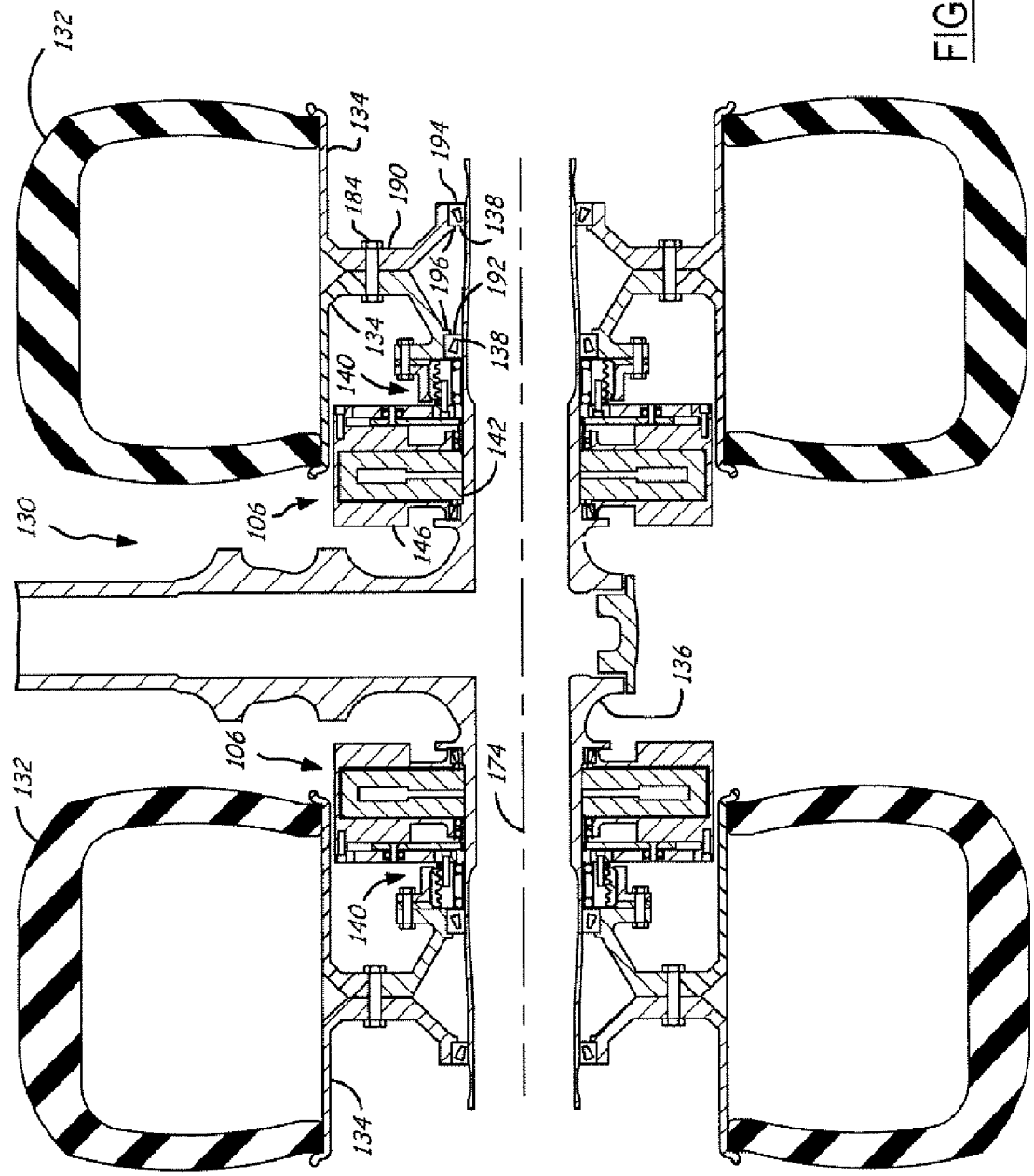
FIG. 4 is a cross-sectional view of a lower portion of a powered nose aircraft landing gear system illustrating a wheel motor configuration in accordance with an embodiment of the present invention.
Figure 5:
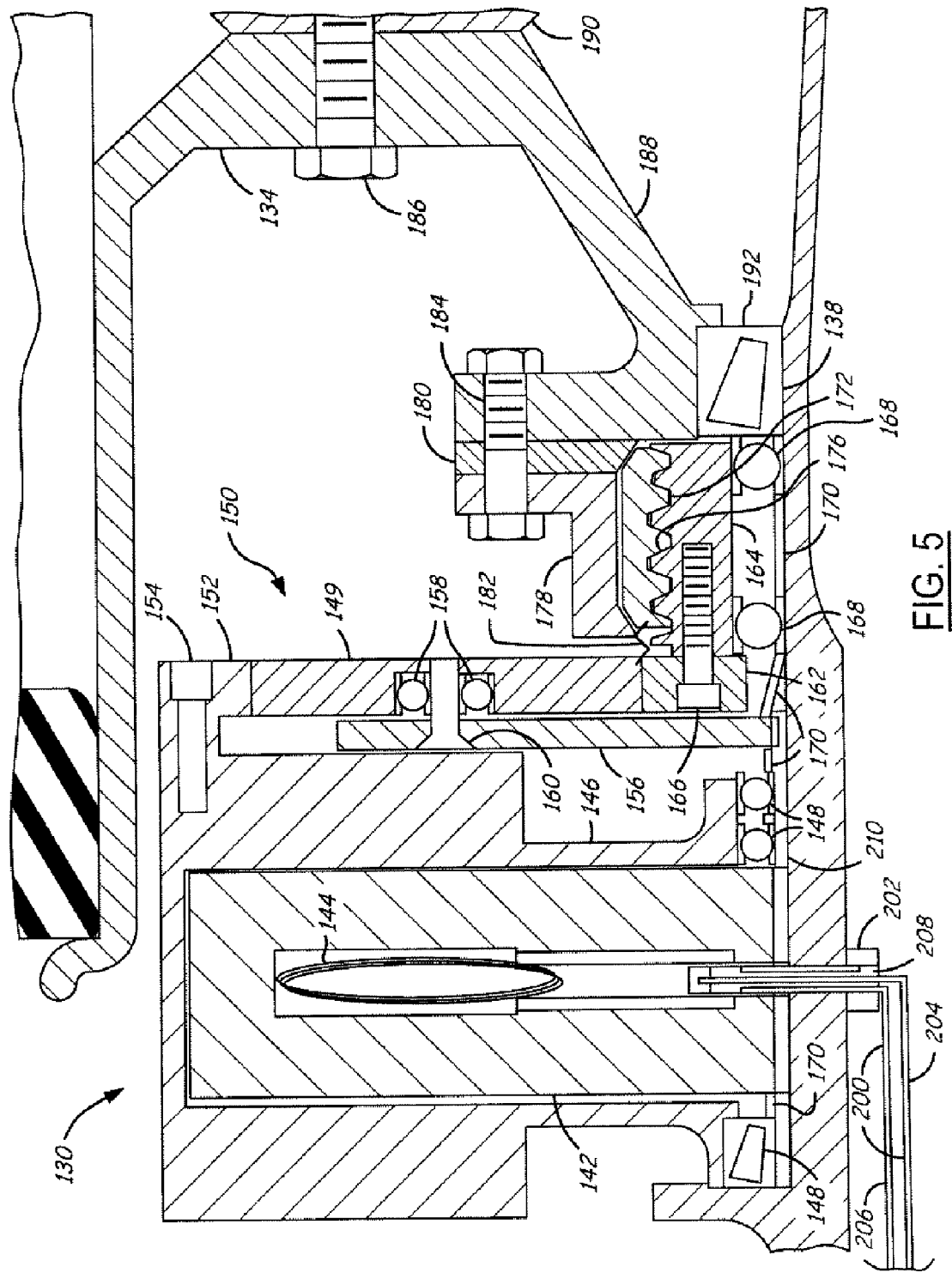
FIG. 5 is a half cross-sectional close up view of a single wheel motor configuration in accordance with an embodiment of the present invention.
Figure 6:
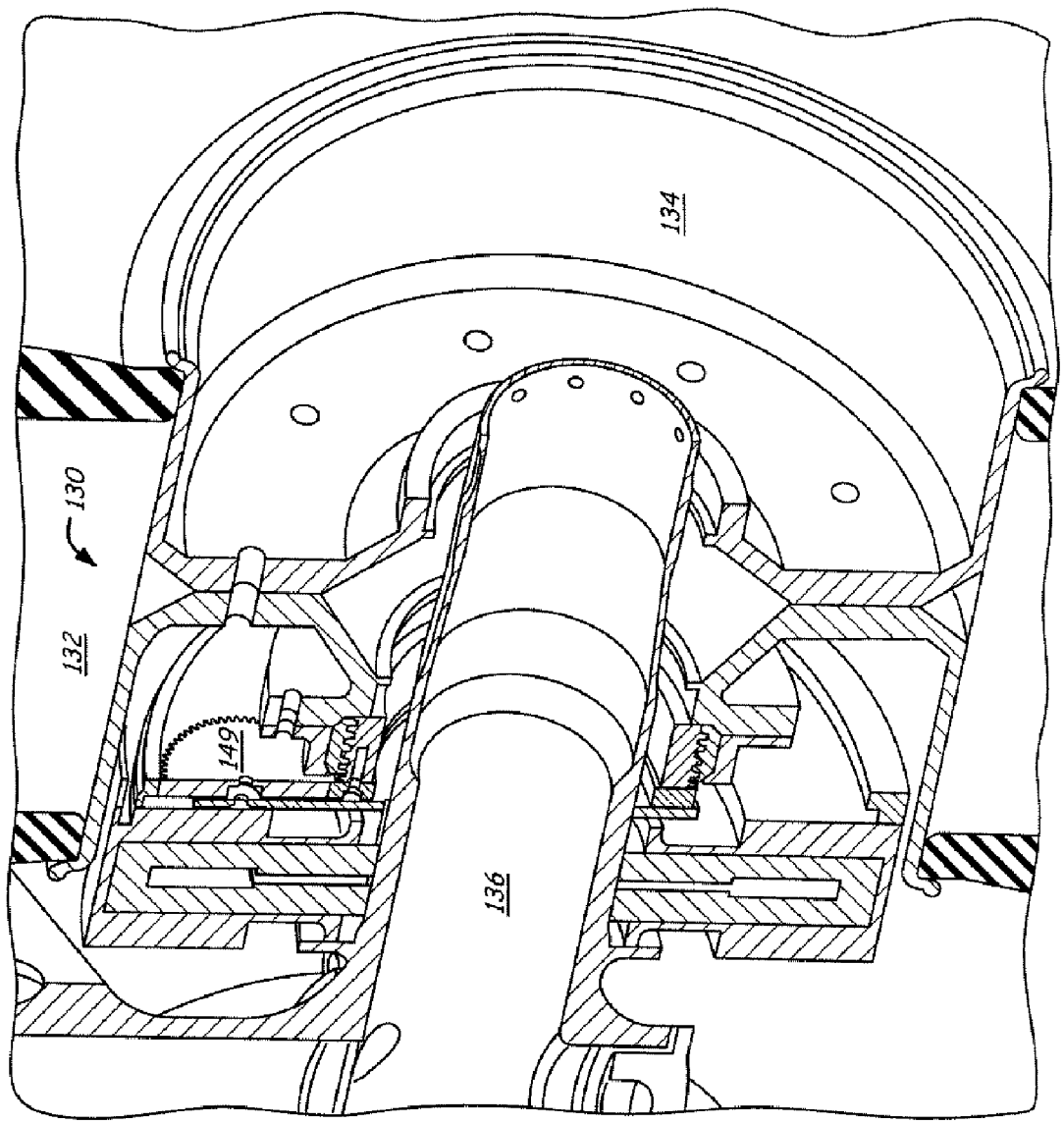
FIG. 6 is an isometric cross-sectional view of a single wheel motor configuration in accordance with an embodiment of the present invention.

Referring now to FIG. 2, a perspective view of an aircraft guidance and mobility system 56 in accordance with an embodiment of the present invention is shown. The guidance and mobility system 56 includes a motor drive speed and steering control panel 57 that is in communication with GPS satellites, such as satellite 58, and a radio control tower 59. The control panel 57 receives position information from the GPS satellites 58 for movement control. The control panel 57 also receives a radio control signal from the tower 59 for speed and route control to and from terminal gates. The guidance and mobility system 56 also includes an electronic and electrical control distribution bay 53, a power steering unit 61, a powered nose aircraft wheel system 62, and a power delivery system 65. The wheel system 62 has multiple wheel assemblies with traction wheel motors 63 (the wheel assemblies and wheel motors are best seen in FIGS. 4-6). The guidance and mobility system 56 may receive signals from the tower 45 for controlling the taxiing of the aircraft 12 to and from a terminal gate. This eliminates the need for wheel walkers and tail walkers, as commonly used for such taxiing.

The distribution bay 53 provides electronic control of and power to aircraft electronic systems. The control panel 57 may be part of the distribution bay 53 or separate as shown.

The power steering unit 61 is utilized to autonomously steer the aircraft 12 through use of the guidance system 56 in concert with the navigation capability of the aircraft 12. The power steering system 61 may be overridden by a pilot of the aircraft 12 via the cockpit override 67 or by airport authority control that is external from the aircraft 12.

The wheel system 62 is used for tarmac movement and mobility, as well as for pre-spinning of the aircraft wheels, such as front wheels 69, prior to landing. The wheel motors 63 are directly coupled to and rotate the front wheels 69. The wheel motors 63 may be located within the hub of the front wheels 69 or elsewhere and may be of the traction motor type. Modern traction motors are capable of producing large torque to weight ratios. The wheel motors 63 may be spun up prior to touch down of the aircraft 12 on a landing strip or runway and reduce tire wear and inertial acceleration loads on the nose gear tire and motor assembly. The pre-spinning of the wheel motors 63 also increases control during a breaking sequence on a slick runway. The wheel motor 63 may be alternating current (AC) or direct current (DC) motors. The wheel motors 63 are activated by the guidance system 56 or by a pilot of the aircraft 12. The wheel motors 63 may be used to decrease the traveling or taxiing speed of the aircraft 12 without the use of brakes, which may reduce the costs associated with brake wear.

Incorporation of wheel motor assemblies economically facilitates ground mobility requirements of the aircraft 12. The wheel motor assemblies may be used in replacement of or in combination with engine thrust and towing trucks. The use of the wheel motor assemblies minimizes human error and increases safety and integrity of an aircraft 12.

The wheel motor assemblies may be staged over the guide-strip 52 by the GPS system 42 and thus allows the guide strip 52 and the ground based radio antennae arrays to precisely guide the aircraft 12 over a prescribed directed and controlled route to and from the interface terminal 14. The wheel motor assemblies may be controlled by a centralized computer ground control system of an airport to assure proper separation of ground traffic and significantly enhance the efficiency, safety and speed of ground mobility. The wheel motor assemblies may be used instead of aircraft primary engines, when taxiing on the tarmac, which reduces fuel consumption. The use of the wheel motor assemblies also eliminates the need for ground personnel to guide the aircraft 12.

The power delivery system 65 includes a supply line 71 and an auxiliary power unit (APU) 73. Power is supplied from the APU 73 to the distribution bay 53 via the supply line 71. The APU 73 may be of various types and styles known in the art.

The guidance system 56 may also include a bank of ultra capacitors 75 to supply load during peak power demands, such as when the aircraft 12 is initially moving from a rest position or accelerating rapidly. This initial load encountered at start of motion is sometimes referred to as a break away load. The guidance system 56 may also include a sensor 77 for close proximity guidance. The sensor 77 is coupled to the control panel 57. The sensor 77 detects objects forward of the aircraft 12, such as a terminal gate, and generates a proximity signal, which may be used by machine vision devices to accurately position the aircraft 12.

The guidance system 56 may support conventionally configured aircraft and use main engines as power mobility, while using the guidance control system 56 to guide movement of the aircraft while on the ground, and within proximity of the airport 13. While used in this manner the guidance control protects the aircraft from discrete source damage from sources, such as pilot over and under steering, and also from damage resultant from tarmac and taxiway collisions.

The aircraft 12 may also include a dynamic braking assembly 90. Electric power supplied to drive the wheels 69 may be controlled to reduce the speed of the aircraft 12 by introducing the power to the motors 63 in the opposite direction of aircraft motion. The electrical fields of the wheel motors 63 may perform as generators when being externally driven, such as during landing. The electrical fields of the wheel motors 63 are positively crossed to generate a large amount of electromagnetic field energy. Dynamic braking can supply adequate energy to charge the ultra-capacitors 75, which can hold that energy in reserve to be available on demand. The stored energy may be used as breakaway starting energy when aircraft motion is initiated or for higher rates of acceleration while under motor wheel power. Once the energy storage capacity is fully used then the motors 63 are disengaged from the dynamic mode to rotate freely to avoid an overcharge condition.

Figure 3:
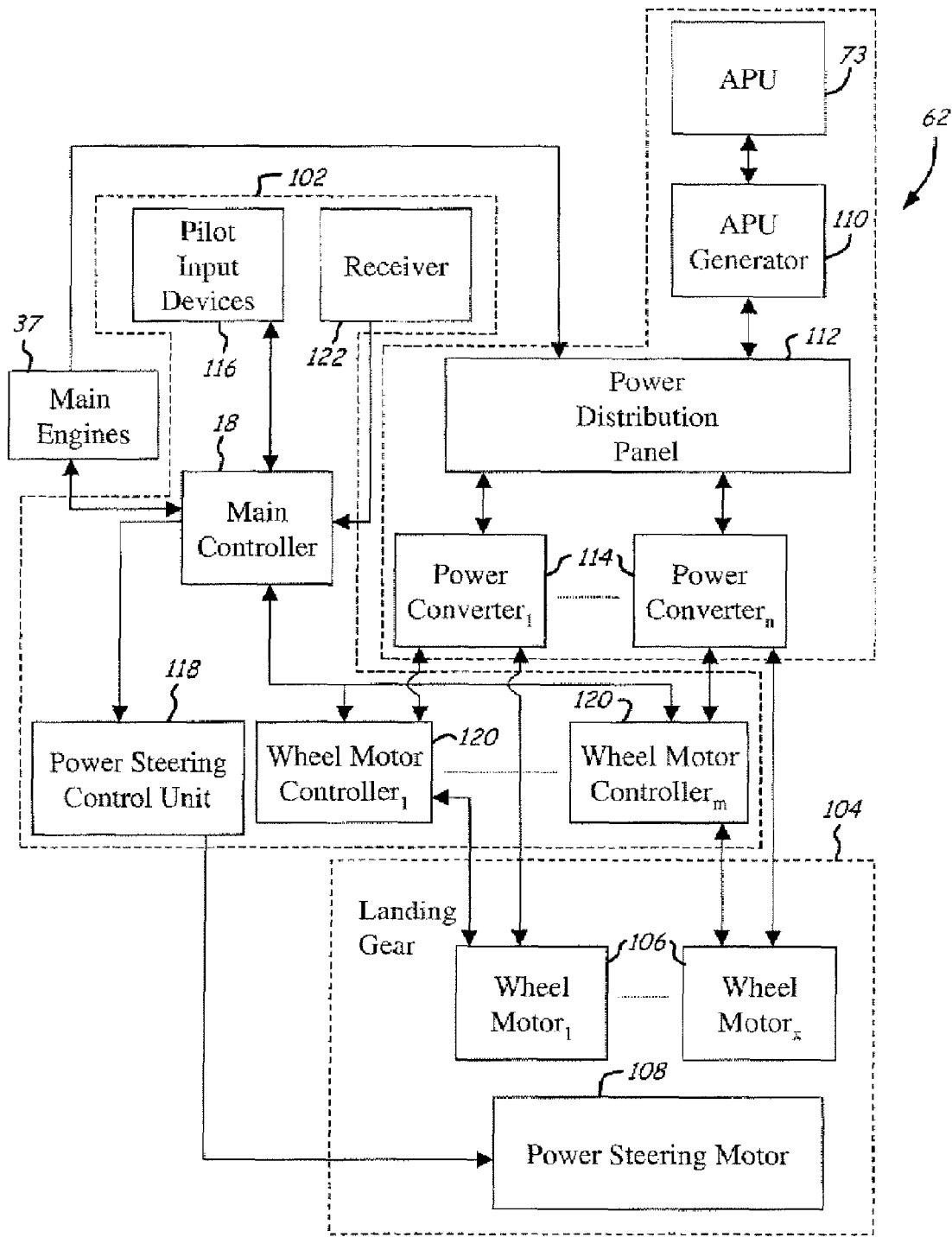
FIG. 3 is a block diagrammatic view of a landing gear control system in accordance with an embodiment of the present invention.

Referring now to FIG. 3, a block diagrammatic view of the landing gear control system 62 in accordance with an embodiment of the present invention is shown. The control system 62 includes a power distribution circuit 100, a control circuit 102, and landing gear 104. The power distribution circuit 100 supplies power to and from the APU 73 to the landing gear 104. The control circuit 102 is used to control the motorized devices within the landing gear 104. The landing gear 104 includes wheel motors 106 and a power steering motor 108.

The power distribution circuit 100 includes the APU 73, an APU generator 110, a power distribution panel 112, and power converters 114. The APU 73 and the APU generator 110 are used to store and generate electrical power. The APU 73 and the APU generator 110 provide electrical energy, which may be used on the ground or in the air to perform various vehicle system tasks. The APU 73 and the APU generator 110 also supply power for emergency operations and redundant power needs. The power distribution panel 112 distributes the electrical power between the APU 73 and the APU generator 110 and other vehicle systems and devices, such as the control circuit 102 and the landing gear 104.

The power converters 114 convert the electrical power between the power distribution panel 112 and the various vehicle systems and devices. The power converters 114 may perform as AC-to-DC converters, DC-to-AC converters, as downconverters, upconverters, or other converter known in the art. The power converters 114 provide the voltage, current, and waveforms desired to produce the torque demanded to move or drive an aircraft. Input to the power converters 114 is based on fully integrated pilot steering and speed control devices, such as the pilot input devices 116, which generate command signals that are routed to a power steering control unit 118 and to wheel motor controllers 120.

The control circuit 102 includes the main controller 18, the power steering control unit 118, and the wheel motor controllers 120. The main controller 18 has inputs for reception of control signals from the pilot input devices 116 and from the receiver 122. The main controller 18 receives control signals or commands from a pilot and from the receiver 122 and in response thereto controls the wheel motors 106 and the power steering motor 108 via the wheel motor controllers 120 and the power steering control unit 118. The receiver 122 may receive control signals, such as control signals 39, from a control tower or a satellite, as described above. The controllers 18, 118, and 120 may be microprocessor based, such as a computer having a central processing unit, have memory (RAM and/or ROM), and associated input and output buses. The controllers 18, 118, and 120 may be or include application-specific integrated circuits or be formed of other logic devices known in the art. The controllers 18, 118, and 120 may be combined, incorporated into a single control unit, or separate stand-alone controllers as shown. The controllers 18, 118, and 120 may also be part of the control panel 57.

The wheel motor controllers 120 have control logic for soft start cycle of the wheel motors 106. Power to the wheel motors 106 is gradually increased or ramped up to reduce starting shock to the motors 106 and other aircraft gear.

The wheel motors 106 can be used as a brake to prevent the aircraft from increasing in speed when traveling downhill. This can be accomplished by alternating between forward and reverse drive modes. The wheel motors 106 may be used to move the aircraft a short distance and hold statically for a short duration to enable removal of wheel chocks (not shown).

Referring now to FIGS. 4-6, cross-sectional and isometric views of a lower portion of a sample powered nose aircraft landing gear system 130 illustrating an example wheel motor configuration in accordance with an embodiment of the present invention are shown. The landing gear system 130 includes the control system 62 and, as shown, includes a pair of tires 132 that are mounted on a pair of rims/wheels 134. The wheels 134 are free to spin on the axel strut 136 via rim bearings 138. The wheels 134 may also be rotated via the wheel motors 106 or used as a source of rotational energy for regenerative energy return.

The wheel motors 106 may be designed for both forward and rearward operation. The wheel motors 106 may include various engagement and disengagement mechanisms. A dual activated cone mechanism may be used for forward and reverse engagement or a reverse sprag (pawl) mechanism may be used when overrunning in forward and locking in reverse is desired. An example of a dual activated cone mechanism 140 is described below. Although a specified number of tires, wheels, and wheel motors are shown, any number of each may be utilized depending upon the aircraft and design configuration.

Each wheel motor 106, as shown, includes a stator 142 that has a winding 144, which is rigidly fixed to the axel 136 and is partially contained by a rotor 146. The rotor 146 is free to rotate on rotor bearings 148 about the axel 136. A magnetic field is generated between the stator 142 and the rotor 146, which causes rotation of the rotor 146. As the rotor 146 spins, it rotates a planetary gear 149 of a planetary gear system 150 via a ring gear 152. Ring gear attachment bolts 154 extend through the ring gear 152 and are fastened to the rotor 146. The planetary gear 148 is mounted on a carrier 156, which is also fixed to the axel 136. The planetary gear 149 rotates on the carrier 156 via planetary bearings 158. A planetary bolt 160 extends through the carrier 156 and the planetary bearings 158 and is fastened to the planetary gear 149. As the planetary gear 149 rotates, it rotates a sun gear 162, which is fixed to an actuation screw 164 via sun gear bolts 166. The actuation screw 164 rotates about the axel 136 on actuation screw bearings 168. The stator 142, the carrier 156, and the bearings 148 and 168 are separated on the axel 136 by separation rings 170. The rings 170 maintain positioning of the wheel motor components. The bearings 138, 148, 158, and 168 may be of various types, sizes, shapes, and styles. The planetary gear system may be eliminated and replaced with a direct drive through the overrunning clutch mechanism in applications where sufficient motor torque is produced relative to the rolling resistance of the aircraft.

As the actuation screw 164 rotates, it drives a dual cone clutch 172 laterally along a centerline 174 of the axel 136. When the rotor 146 rotates in a first direction the threaded engagement 176 with the actuation screw 164 cause the dual cone clutch 172 to laterally move inward toward the rotor 146 to engage with the first clutch reaction plate 178. When the rotor 146 rotates in a second or opposite direction the actuation screw 164 causes the dual cone clutch 172 to laterally move outward to engage with the second clutch reaction plate 180. Two clutch reaction plates are utilized, as opposed to a single unitary reaction plate, for ease of assembly.

When the speed of the wheel 134 increases to be approximately equal to or greater than the rotational speed of the actuation screw 164, the dual cone clutch 172 disengages from the reaction plates 178 and 180 to allow the wheel 134 to spin freely, such as during aircraft takeoff or landing. A disengagement spring 182 that is coupled between the sun gear 162 and the dual cone clutch 172 is used to disengage the reaction plates 178 and 180 for free spinning of the wheel 134. When the reaction plates 178 and 180 are disengaged, aircraft main engines provide power as opposed to the wheel motors 106.

Rim attachment bolts 184 extend through and fasten the wheel 134 to the clutch plates 178 and 180. Rim assembly bolts 186 are used to couple outer rim halves 188 to inner rim halves 190 of each wheel 134 to each other. The inner rim halves 190 ride on the inner wheel bearings 192 and the outer rim halves ride on the outer rim bearings 194. The bearings 192 and 194 are held in place via tabs 196.

The windings 144 receive power via electrical lines 200, which are coupled through power bolts 202. The electrical lines 200 include power lines 204 and ground lines 206 that are separated by insulation material 208, which is contained within the bolts 202. The power bolts 202 extend through the axel 136 and into the stator 142 and are fastened to the axel 136. The ground lines 206 may be coupled to a splice 210, which is disposed on the axel 136 and is mounted between the axel 136 and the stator 142, the carrier 156, and the rotor bearings 148.

The planetary gear system 150 in combination with the wheel motors 106 reduces the required motor size and weight needed to operate within a designed torque/speed operational envelope of aircraft service requirement for taxiing. When a wheel motor is used that has adequate torque output and satisfies weight and size requirements, the planetary gear system 150 may be eliminated.

Figure 7:
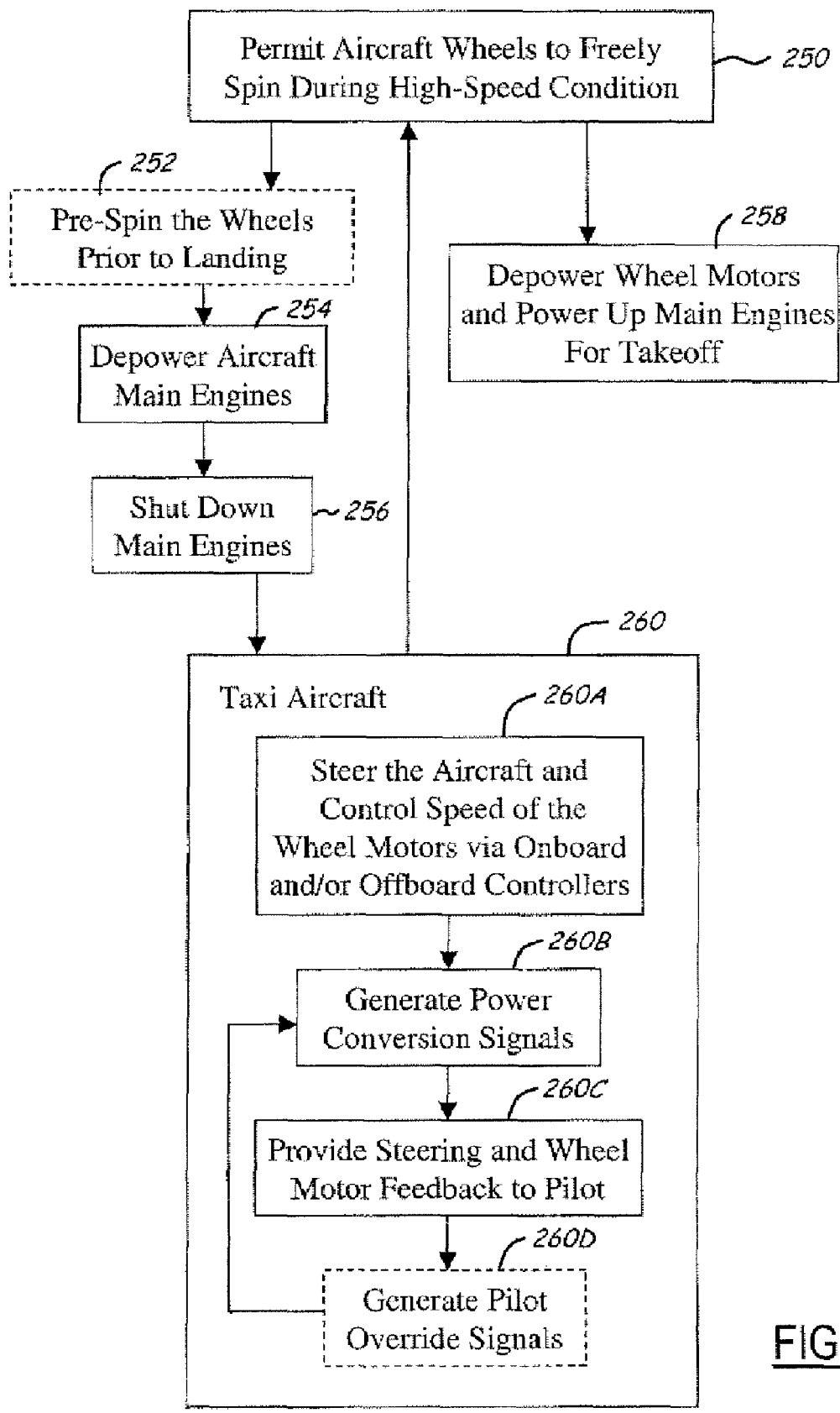
FIG. 7 is a logic flow diagram illustrating a method of controlling ground operation and taxiing of an aircraft in accordance with an embodiment of the present invention.

Referring now to FIG. 7, a logic flow diagram illustrating a method of controlling ground operation and taxiing of an aircraft in accordance with an embodiment of the present invention is shown.

In step 250, one or more wheels of an aircraft are permitted to freely spin during a high-speed condition, such as during landing or takeoff of the aircraft. A high-speed condition does not refer to when the aircraft is taxiing to and from a terminal.

In step 252, the wheels may be pre-spun prior to landing of the aircraft to minimize wear and system shock upon touch down. Power is transferred from an APU or main engine power unit to one or more wheel motors that are coupled to the wheels. A main controller and wheel motor controllers, such as the controllers 18 and 120, supply power to the stators and rotors of the wheel motors to create the magnetic field to generate the torque/speed ratio desired to initiate tire rotation. The supply power may be ramped up to gradually increase the speed of the wheels.

In step 254, upon landing of the aircraft the main engines are depowered to an idle state and the wheel motors are powered as described above with the APU. When the speed of the aircraft is reduced to approximate taxiing speeds, the main engines are depowered and/or shut down. Taxiing is performed via the wheel motors and thus wheel motor speed is increased. As wheel motor speed becomes greater than the speed of the wheels the wheel motors are engaged to drive or rotate the wheels. Since the aircraft is driven via the wheel motors, the main engines may be idled for a predetermined idle or cooling period. The cooling period is determined such that the main engines are at suitable temperatures prior to and for safe shutdown. In step 256, the main engines are shut down after the predetermined idle time.

In step 258, during takeoff the wheel motors are depowered and the main engines are powered up to provide the thrust needed for flight. The main controller and wheel motor controllers gradually decrease the power supplied to the wheel motors when the aircraft speed increases and the drive power is switched over and provided by the main drive motors.

In step 260, the aircraft is taxied to and from a terminal. In step 260A, steering the aircraft and controlling speed of the wheels via the onboard controllers or an offboard controller, such as the tower 45. Steering and speed control command signals may be generated and routed to wheel motor controllers. The command signals may be received from the pilot input devices or via a receiver, such as the input devices 116 and the receiver 122.

In step 260B, power conversion signals are generated in response to processing of the pilot steering and speed control command signal. The power conversion signals include information, such as voltage, current, and waveforms desired for proper wheel motor performance.

In step 260C, feedback is provided to the pilot such that the pilot has a direct feel of aircraft ground maneuvers. The feedback may be in the form of feedback signals generated or routed from wheel motors, a steering motor, power converters, and controllers, such as those mentioned above.

In step 260D, override control signals may be generated via the pilot input devices, such as during an emergency situation.

Figure 8:
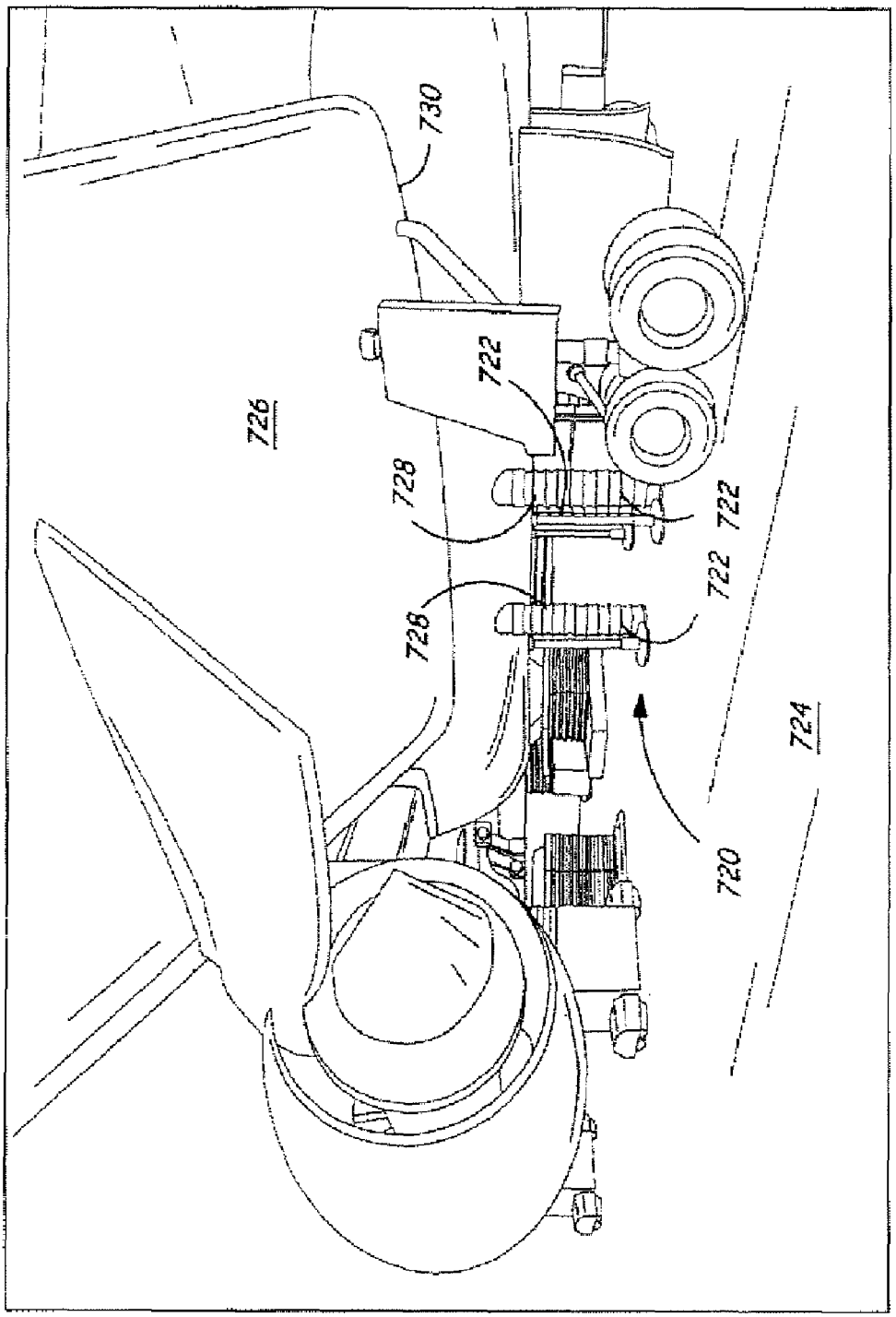
FIG. 8 is a perspective view of a fuel hydrant supply system in accordance with yet another embodiment of the present invention.

Referring now to FIG. 8, a perspective view of a fuel hydrant supply system 720 in accordance with yet another embodiment of the present invention is shown. The fuel hydrant supply system 720, as shown, is a four-point hydrant system, which includes two pair of hydrants 722 that extend from the tarmac 724 and couple to the aircraft 726. Each of the hydrants 722 may also have an inner supply tube (not shown, but similar to inner tube 233) and an outer jacket 728 for pulling fumes away from the aircraft 726. The hydrants 722 may be coupled on a side of the aircraft 726 inboard of a wing to body joint 730, as shown, or may be couple to other locations on the aircraft 726.

Figure 9:
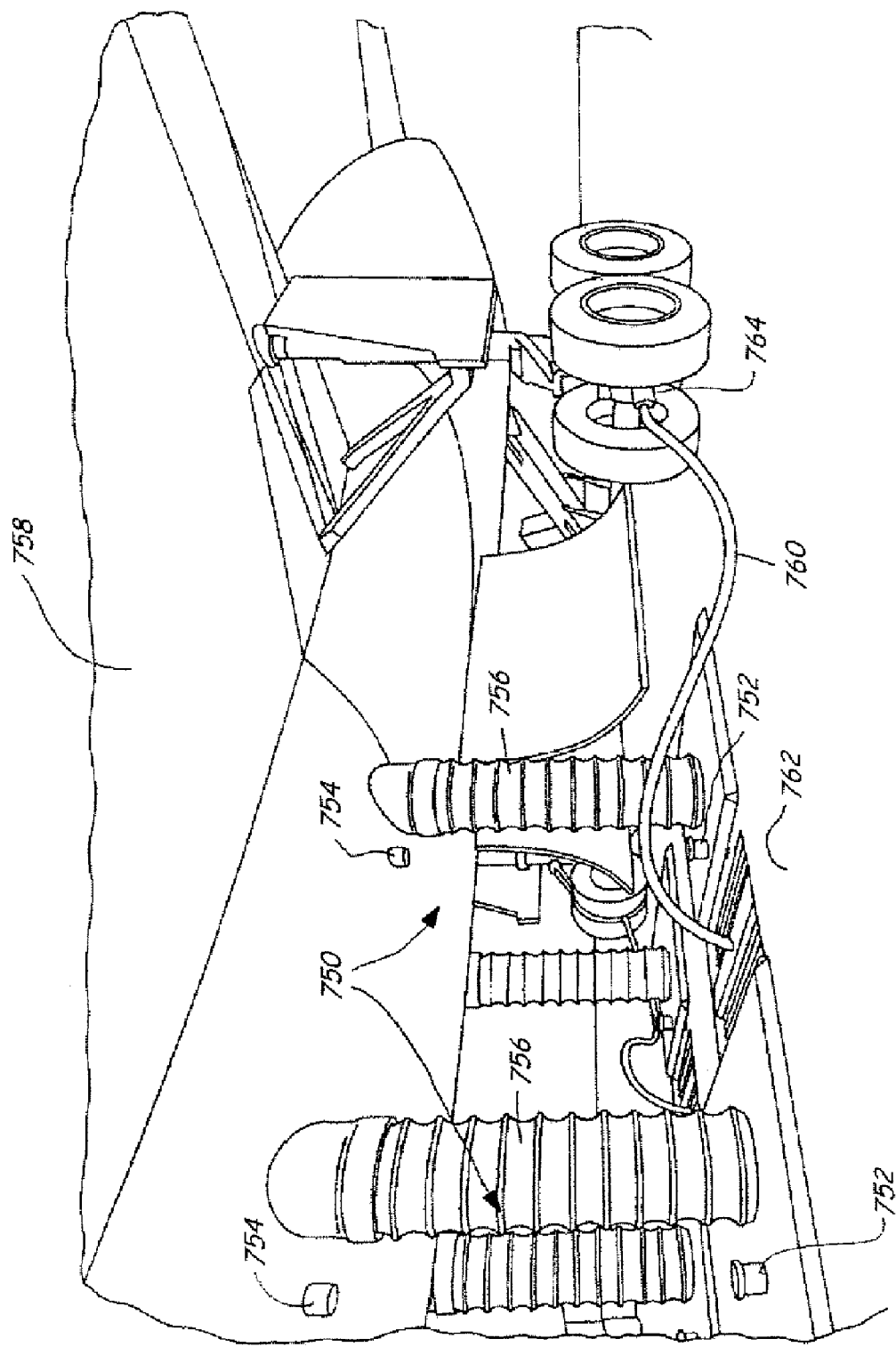
FIG. 9 is a perspective view of a machine vision alignment system in accordance with another embodiment of the present invention.

Referring now to FIG. 9, a perspective view of a machine vision alignment system 750 in accordance with another embodiment of the present invention is shown. The alignment system 750 includes cameras 752 and alignment couplers 754. The alignment system 750 may be used in conjunction with the nose aircraft landing gear system by vehicle onboard systems to align cameras 752 with the couplers 754. This alignment system 750 and the nose aircraft landing gear system aid in aligning the fueling ports of the aircraft 758 with the flow back and vapor collection jackets 756. The sample embodiment of FIG. 9 also illustrates the supply of brake coolant via a coolant line 760 between the tarmac 762 and the brake system 764 of the aircraft 758. The brake coolant line is an alternative embodiment to the tarmac air-cooling system employed in another embodiment of the present invention.

Figure 10:
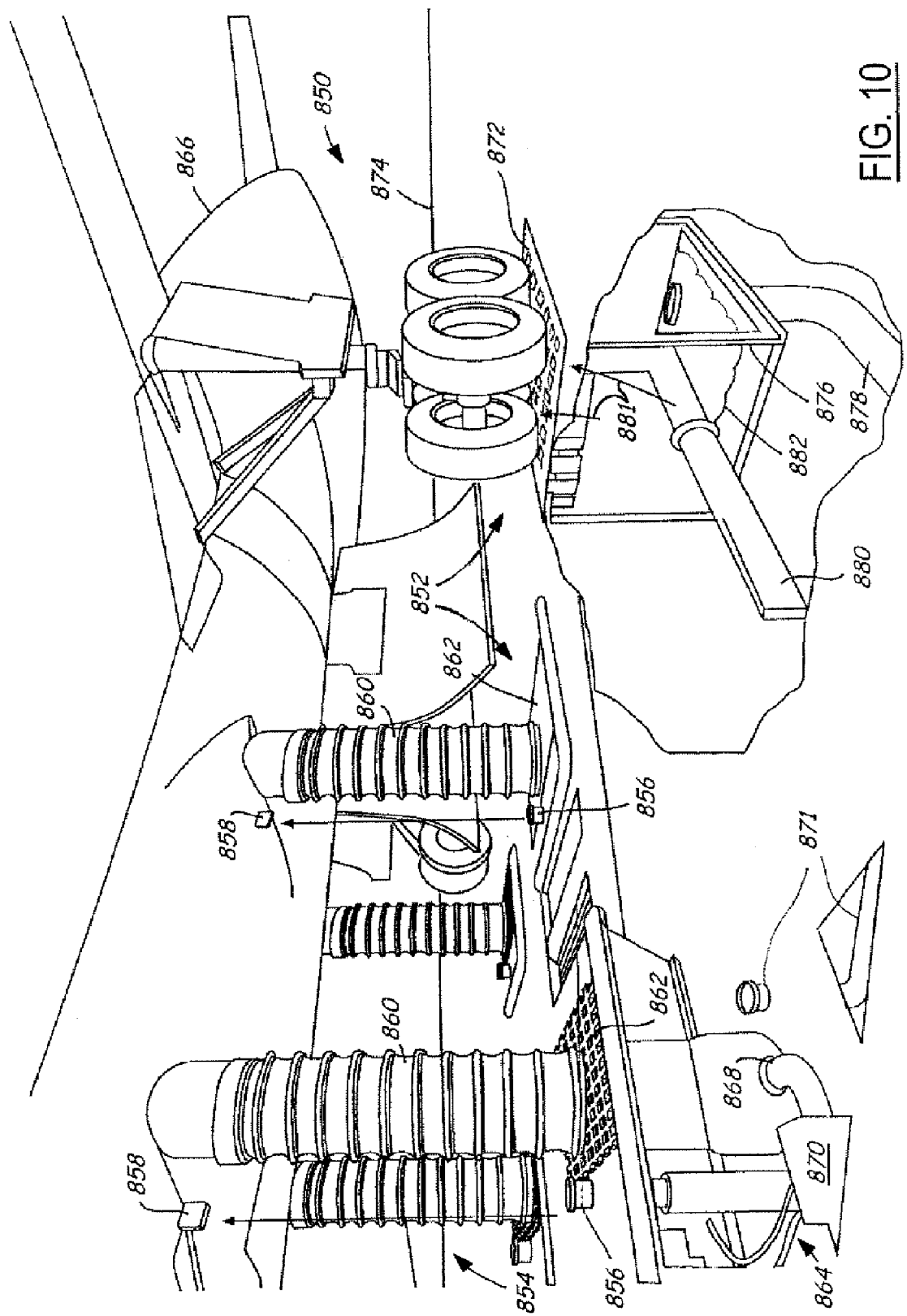
FIG. 10 is a perspective view of a fuel hydrant supply and brake cooling system incorporating a drainage system in accordance with another embodiment of the present invention.

Referring now to FIG. 10, a perspective view of a fuel hydrant supply and brake cooling system 850 incorporating a drainage system 852 in accordance with another embodiment of the present invention is shown. The fuel supply and brake system 850 includes a machine vision alignment system 854 similar to the alignment system 750 with cameras 856 and alignment couplers 858. The fuel supply and brake system 850 also includes fueling ports with flow back and vapor collection jackets 860 and spill traps 862. Any liquid or fuel spillage on the tarmac near the flow back and vapor collection jackets 860 drains through the spill traps 862 underground into an undertarmac level 864 and is isolated from the aircraft 866. A fuel line 868 is coupled to the flow back and vapor collection jackets 860 and to a fuel control valve 870, which is used to adjust the flow of fuel to the aircraft 866. A fluid drainpipe 871 resides in the undertarmac level 864 and allows for drainage of fluids residing therein.

In addition, tarmac brake coolant vents 872 are provided to allow for cooling air to be emitted from the tarmac 874 and directed at the brakes (not shown) of the aircraft 866. The vents 872 serve as an air vent and as a spill trap. Ambient air may flow through the vents 872. Any fluids leaking from the aircraft 866 near the brakes drains through the vent 872, is collected into a holding reservoir 876, and eventually out a drainage pipe 878. An air supply pipe 880 is coupled to the holding reservoir 876 above a fluid level 882 such that the air does not flow through any fluid contained therein. Air directed at the brakes is represented by arrows 881.

Figure 11:
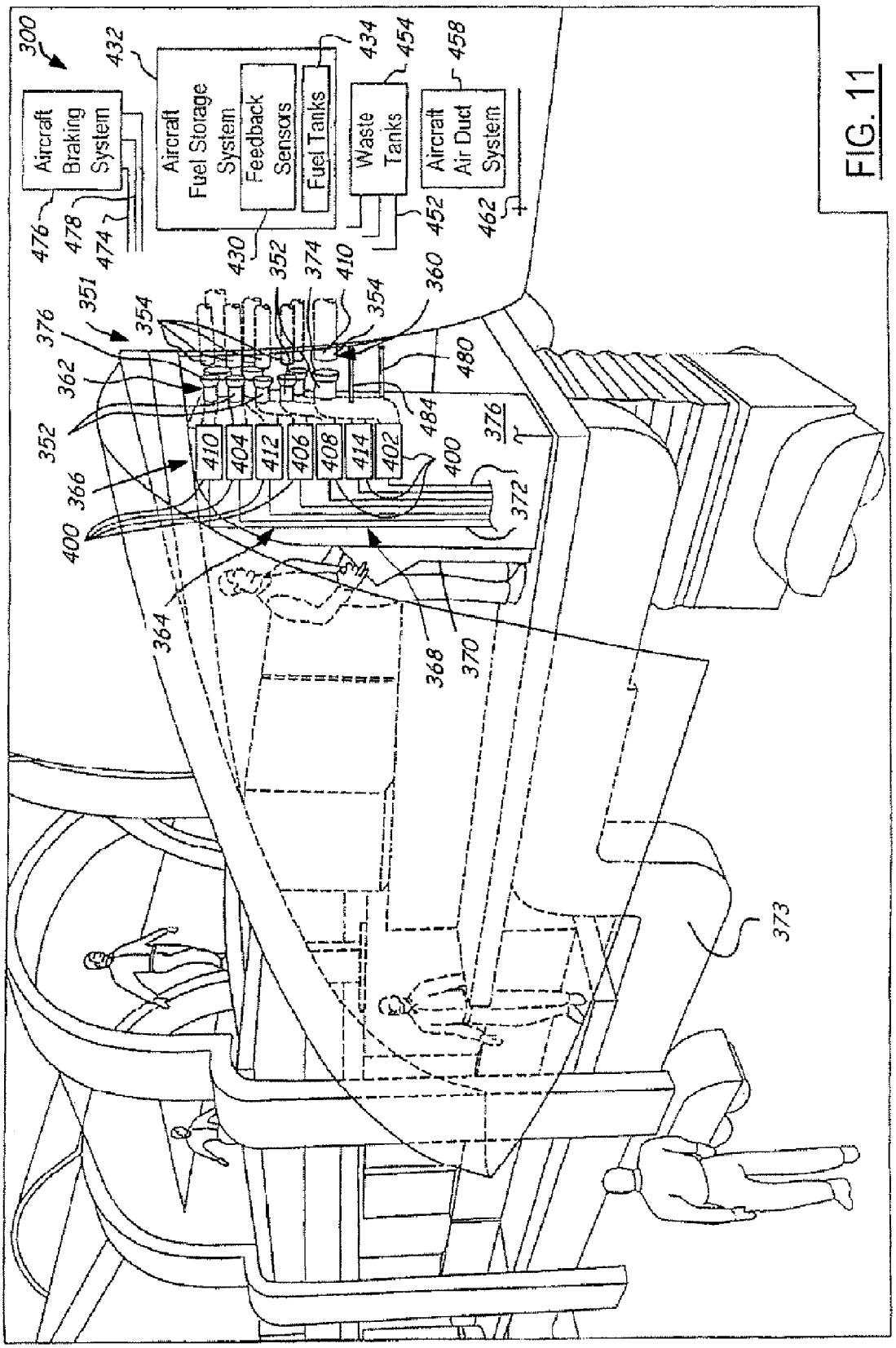
FIG. 11 is a side perspective view of the integrated operational ground support system illustrating an aircraft primary service system in accordance with an embodiment of the present invention.

Referring now to FIG. 11, a side perspective view is shown of an integrated support system 10' illustrating the primary service system 300 in accordance with an embodiment of the present invention. The primary service system 300 includes a main control panel station 350 and multiple primary service support sub-systems 351. The main station 350 couples to the aircraft 12 via multiple primary service couplers. The primary service couplers include a first series of couplers 352 and a second series of couplers 354. The first couplers 352 are located on the main station 350. The second couplers 354 are located on the aircraft 12 and mate with the first couplers 352. The primary service sub-systems 351 include a fuel system 360, an electrical power system 362, water systems 364, air systems 366, and a brake cooling system 368, which are controlled via a station controller 370.

Each of the primary sub-systems 351 has an associated conduit 372 that extends from the interface terminal through a service conduit extension 373 to the associated first coupler 352. A large separation distance exists between a fuel hydrant 374 and an electrical coupler 376 to prevent electrical arcing to fuel. Other isolation techniques known in the art may also be utilized to separate the fuel hydrant 374 from the electrical coupler 376. Fuel is delivered by the hydrant 374 rather than by fuel trucks, which minimizes deicing requirements caused by cold soaked fuel and provides a constant and desirable temperature fuel year-round.

The fuel system 360, the water systems 364, the air systems 366, and the brake cooling system 368 have associated pumps 400, specifically a fuel pump 402, a potable water pump 404, a gray water vacuum pump 406, a brown water vacuum evacuation pump 408, an air start pump 410, an air conditioning pump 412, and a brake coolant pump 414. The pumps 400 may be located within the main station 350 or may be located elsewhere in the interface terminal or at some other central location whereby multiple interface terminals may share and have access thereto.

The aircraft 12 is refueled through the high-pressure fuel hydrant 374 that extends to and couples with fueling ports 411 (only one is shown) on each side of the aircraft 12 when dual main stations are utilized. Machine vision ensures that the couplers 354 align in their proper orientation while redundant sensors 420 ensure that fuel does not begin to flow until coupling is complete. The sensors 420 may be in the form of contact limit sensors, which are activated when the clamping mechanism 421 is fully actuated. The sensors 420 may be backed up by continuity sensors, which indicate when the clamping mechanism is in a fully clamped position. Feedback sensors 430 from the aircraft fuel storage system 432 indicate when fueling is complete and the fuel tanks 434 are properly filled. Relief valves and flow back devices 429 may be used to ensure that any system malfunction does not result in spillage. The flow back devices 429 may be located at the level or point of entry into the fuel tanks 434 to prevent fuel from being retained in the lower level plumbing or lines (not shown) between the couplers 354 and the fuel tanks of the aircraft. The lower level lines may then be gas inerted after filling is complete.

The fuel hydrant 374 may be double walled and include an inner tube 433 with an outer jacket 435. Fuel is supplied through the inner tube 433. The outer jacket 435 is used to capture vapor and also serve as a relief flow back system. The feedback sensors 430 are connected to the fueling system 432. The fuel supply architecture of the interface terminal provides for underground fuel storage.

Electrical power and potable water couplers are mated similar to that of the fuel coupler 374. The vacuum couplers connect to the holding tank dump tubes 452. The waste tanks 454 may then be vacuumed empty. The air-conditioning coupler connects to the aircraft air duct system 458. The engine start air coupler connects to the aircraft engine start air lines 462. The brake coolant coupler is connected to the cooling lines 474 of the aircraft braking system 476. When dynamic field brakes are utilized heat dissipation within the braking system 476 may be accommodated through other techniques known in the art rather than through the use of the brake coolant 478. The electrical power coupler, the potable water coupler, the vacuum couplers, the air-conditioning coupler, the engine start air coupler, and the brake coolant coupler are not each numerically designated due to space constraints, but are shown and generally designated and included in the first couplers 352.

The main station 350, via the station controller 370, adjusts the amount of fluids, air, and electrical power supplied to and pumped from the aircraft 12. A control panel operator may monitor the main station 350 and shut down any of the sub-systems 351 that are operating inappropriately or the main controller 370 may in and of itself shut down one or more of the sub-systems 351. Although a single main station is shown for a single side of the aircraft 12, any number of main stations may be utilized.

The main station 350 also includes a static contact neutralizing connection 480 that connects with the aircraft 12 before connection by the other couplers 352 and 354. The neutralizing connection 480 eliminates any static charge that may exist between the aircraft 12 and the interface terminal.

A down-load/up-load interface coupler 484 for system health and maintenance monitoring and control is also provided in the main station 350. The down-load/up-load interface coupler 484 is coupled to and is used for offboard monitoring, checking, and adjusting of aircraft onboard electric systems and controls.

The interface terminal 14 is extendable to the aircraft 12 and as such the service conduit 373 are also extendable. The main station 350 may control extension of the interface terminal. The service conduit extension 373 may be telescoping and be extended to or retracted from the aircraft 12.

Figure 12:
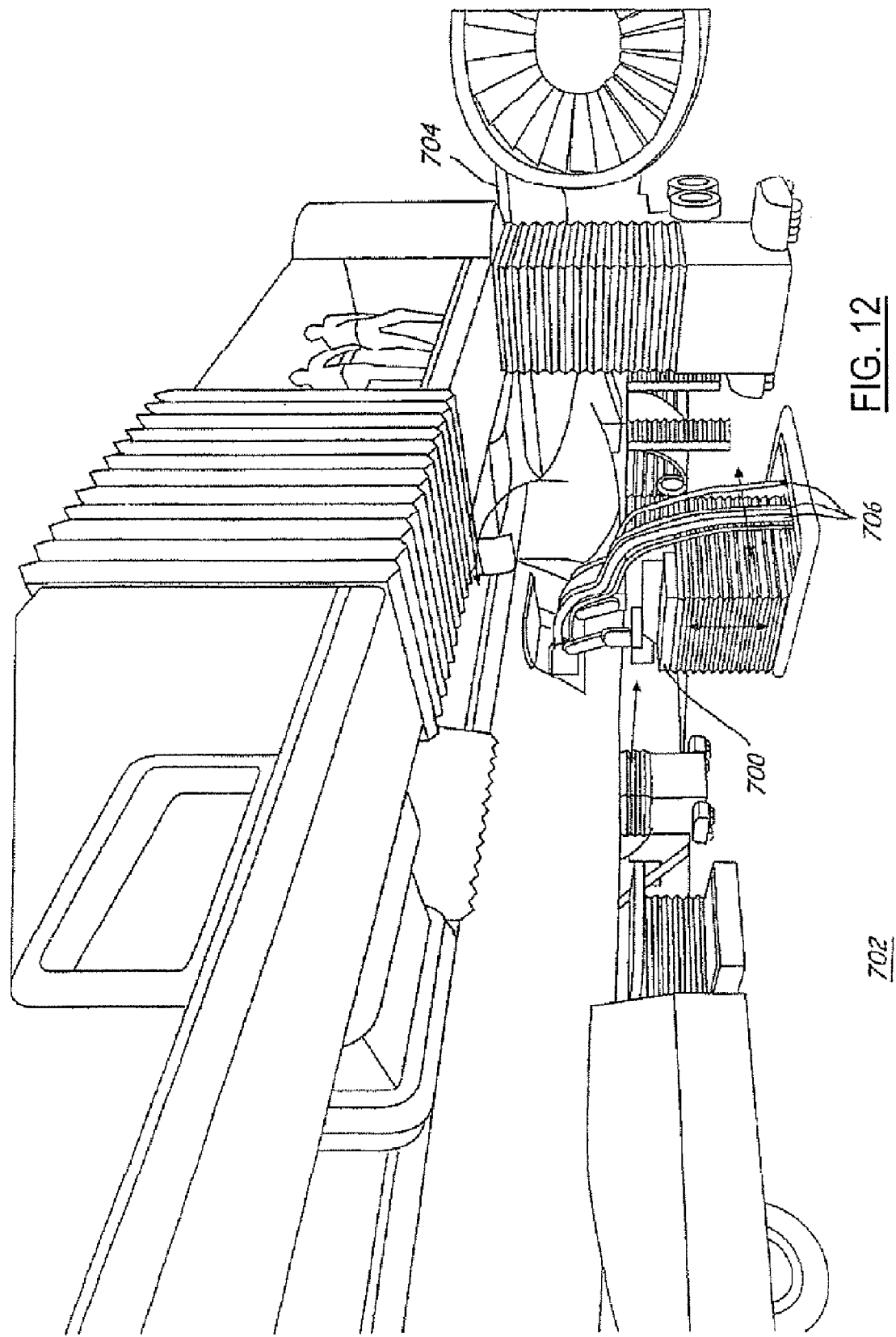
FIG. 12 is a perspective view of a tarmac interface service system in accordance with an embodiment of the present invention.

Referring now to FIG. 12, a perspective view of a tarmac interface service system 700 in accordance with an embodiment of the present invention is shown. The tarmac service system 700 extends out from the tarmac 702 and couples to the aircraft 704. The tarmac service system 700 may couple to the aircraft 704 in various locations. The tarmac service system 700 provides primary services to the aircraft 704. Conduit 706 is coupled to the aircraft 704, as shown, and fuel, air, electrical power, water, and coolant may be supplied to the aircraft 704. Fluids, such as potable water system and gray water may be removed from the aircraft 704 or be refurbished.

The present invention provides integrates ground support systems that provide shortened gate turn around times and are convenient and efficient for both the airlines and flying public. The architecture of the integrated system provides shortened gate turn around cycles, reduced ground support personnel, reduced ground support equipment, and reduced risk of damage to an aircraft through ground support activities. The present invention also improves airport runway capacity and gate and thus airport throughput, which reduces long term need for airport expansion programs. The present invention also minimizes ground support equipment needed for servicing of an aircraft.

The above-described apparatus and method, to one skilled in the art, is capable of being adapted for various applications and systems including: aeronautical systems, land-based vehicle systems, water based ferry and ship systems, or other applications or systems known in the art that require servicing of a vehicle. The above-described invention can also be varied without deviating from the true scope of the invention.

What is claimed is:

1. A powered nose aircraft wheel system for an aircraft comprising:
   aircraft nose landing gear extending from the aircraft;
   at least one wheel axel coupled to said landing gear;
   at least one wheel coupled to said at least one wheel axel;
   at least one electric wheel motor coupled to said at least one wheel axel and said at least one wheel, wherein said at least one wheel motor comprises a rotor and a stator, and performs as at least one of a motor, a generator, and a brake;
   a drive assembly coupled to said at least one wheel motor and said at least one wheel and transferring energy therebetween wherein said drive assembly comprises a dual activated engagement mechanism for forward and reverse operation which is adapted to permit a wheel to freely spin during a high speed condition and to be used as a source of rotational energy for regenerative energy return and to be pre-spun prior to landing of the aircraft to minimize wear and system shock upon touchdown;
   an auxiliary power unit or a ground based power supply and delivery system, said at least one wheel motor coupled to and receiving power from said auxiliary power unit or ground based supply; and
   a controller coupled to said at least one wheel motor and rotating said at least one wheel.

2. A system as in claim 1 wherein said controller directs the aircraft to and from a terminal gate via said at least one wheel motor.

3. A system as in claim 1 further comprising a receiver coupled to said controller, said controller receiving remotely generated control signals and maneuvers the aircraft in response to said control signals.

4. A system as in claim 1 further comprising a guidance control system generating control signals, said controller maneuvers the aircraft in response to said control signals.

5. A system as in claim 1 wherein said controller depowers aircraft main engines prior to or during engagement of said at least one wheel motor.

6. A system as in claim 1 wherein said controller maneuvers the aircraft in response to pilot command signals.

7. A system as in claim 1 wherein said drive assembly comprises a gear, said controller rotating said gear in a first direction to move the aircraft forward and in a second direction to move the aircraft rearward.

8. A system as in claim 1 wherein said drive assembly disengages from said at least one wheel when said wheel rotates at a speed approximately equal to or greater than rotation speed of said drive assembly.

9. A system as in claim 1 wherein said dual activated engagement mechanism comprises:
   at least one gear; and
   a clutch assembly coupled to said at least one gear;
   said at least one gear and said clutch assembly engaging said at least one wheel with said at least one wheel motor.

10. A system as in claim 9 wherein said clutch assembly is a dual activated cone mechanism.

11. A system as in claim 1 wherein said controller pre-spins said at least one wheel prior to landing of the aircraft.

12. A system as in claim 1 further comprising an aircraft terminal mating system thereby providing a ground support system.

13. A ground support system as in claim 12 wherein said aircraft terminal mating system is in the form of a machine vision technology system.

14. A ground support system as in claim 12 wherein said aircraft terminal mating system comprises a docking coupler.

15. A ground support system as in claim 12 wherein said aircraft terminal mating system comprises a global positioning system.

16. A ground support system as in claim 12 wherein said aircraft terminal mating system comprises a precision guidance system that follows a guideline in mating the at least one aircraft to at least one airport interface terminal docking port.

17. An integrated operational ground mobility system comprising:
   a remotely located offboard controller transmitting control signals; and
   at least one aircraft comprising a powered nose aircraft wheel system comprising:
      aircraft nose landing gear extending from said at least one aircraft;
      at least one wheel axel coupled to said landing gear;
      at least one wheel coupled to said wheel axel;
      at least one electric wheel motor coupled to said wheel axel and said at least one wheel; wherein said at least one wheel motor comprises a rotor and a stator, and performs as at least one of a motor, a generator, and a brake;
   a drive assembly coupled to said at least one wheel motor and said at least one wheel and transferring energy therebetween wherein said drive assembly comprises a dual activated engagement mechanism for forward and reverse operation which is adapted to permit a wheel to freely spin during a high speed condition, and to be used as a source of rotational energy for regenerative energy return, and to be pre-spun prior to landing of the aircraft to minimize wear and system shock upon touchdown;

an auxiliary power unit or a ground based power supply and delivery system, said at least one wheel motor coupled to and receiving power from said auxiliary power unit or ground based supply; and an onboard controller coupled to said at least one wheel motor and rotating said at least one wheel in response to said control signals.

18. A system as in claim 17 further comprising a global positioning system coupled and providing guidance information to said onboard controller.

* * * * *